United States Patent [19]

Dillon

[11] Patent Number: 5,129,563
[45] Date of Patent: Jul. 14, 1992

[54] ASSEMBLY FOR MOUNTING A SHOTGUN TO A CAR SEAT

[76] Inventor: John Dillon, 273 Bay Esplanade, Clearwater Beach, Fla. 34630

[21] Appl. No.: 558,956

[22] Filed: Jul. 27, 1990

[51] Int. Cl.⁵ ............................................. B60R 7/14
[52] U.S. Cl. ............................ 224/275; 224/42.45 R; 224/913
[58] Field of Search ............. 224/275, 42.44, 42.46 B, 224/913, 42.45 R, 42.25; 296/37.2, 37.15; 211/64

[56] References Cited

U.S. PATENT DOCUMENTS

| | | | |
|---|---|---|---|
| 1,646,266 | 10/1927 | Stoner | 296/37.15 |
| 3,802,612 | 4/1974 | Smith | 224/913 |
| 3,857,491 | 12/1974 | Townsend et al. | 224/913 |
| 4,364,499 | 12/1982 | McCue | 211/64 |

Primary Examiner—Renee S. Luebke

[57] ABSTRACT

An apparatus that safely locks a shotgun within the forward passenger compartment of a vehicle. A gun carrier receives the receiver part of the shotgun and includes an opening that receives the trigger group of the weapon so that when the trigger group is positioned in the opening, the shotgun is properly positioned in the apparatus. The apparatus includes a base member immovably mounted to a passenger seat, and an elongate pivot arm is hingedly secured to the base member. The gun carrier is secured to the distal free end of the pivot arm. Thus, a police office may adjust his or her driver's seat rearwardly or forwardly and the pivot arm follows such movement and does not restrict such movement. The gun carrier may be opened by activating a solenoid through a switch on the dashboard of the vehicle, or, in the alternative, by using a key. Thus, if the solenoid fails for any reason, the officer can still open the gun carrier with the key. The key assembly includes a unique apparatus for overriding a solenoid by driving its plunger into a retracted position.

16 Claims, 3 Drawing Sheets

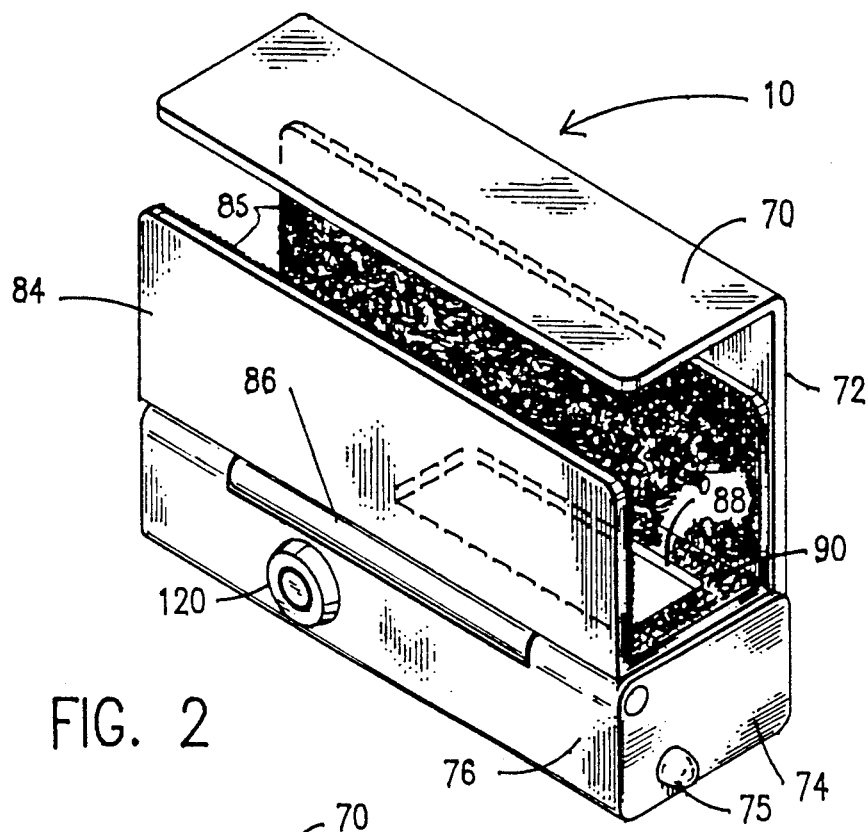
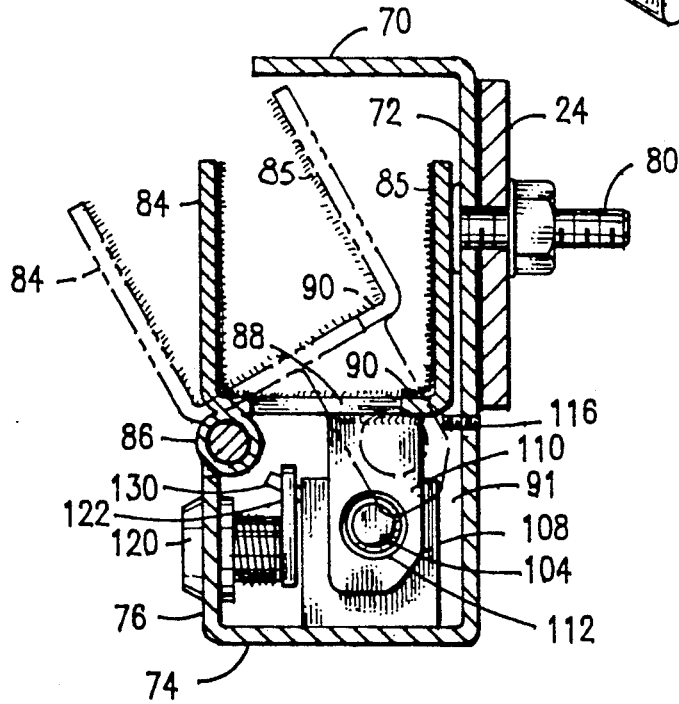

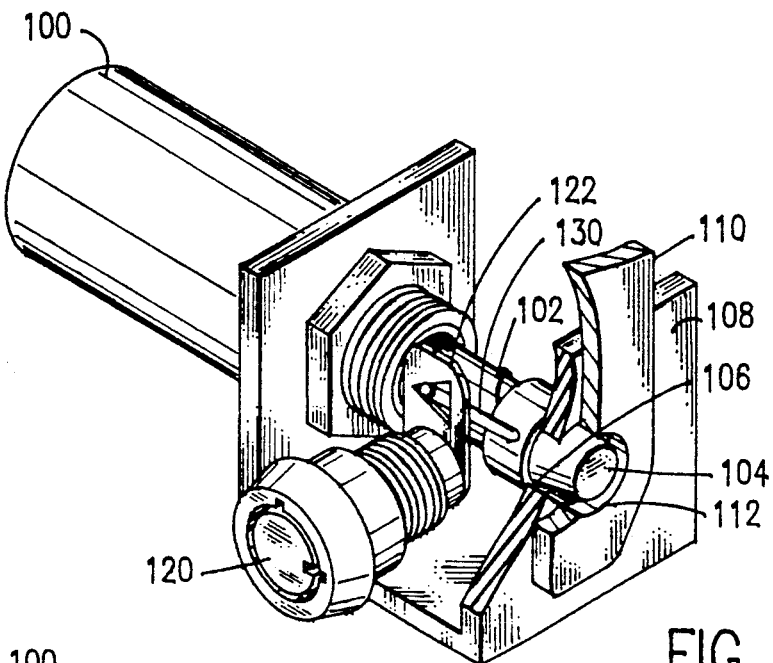
FIG. 4
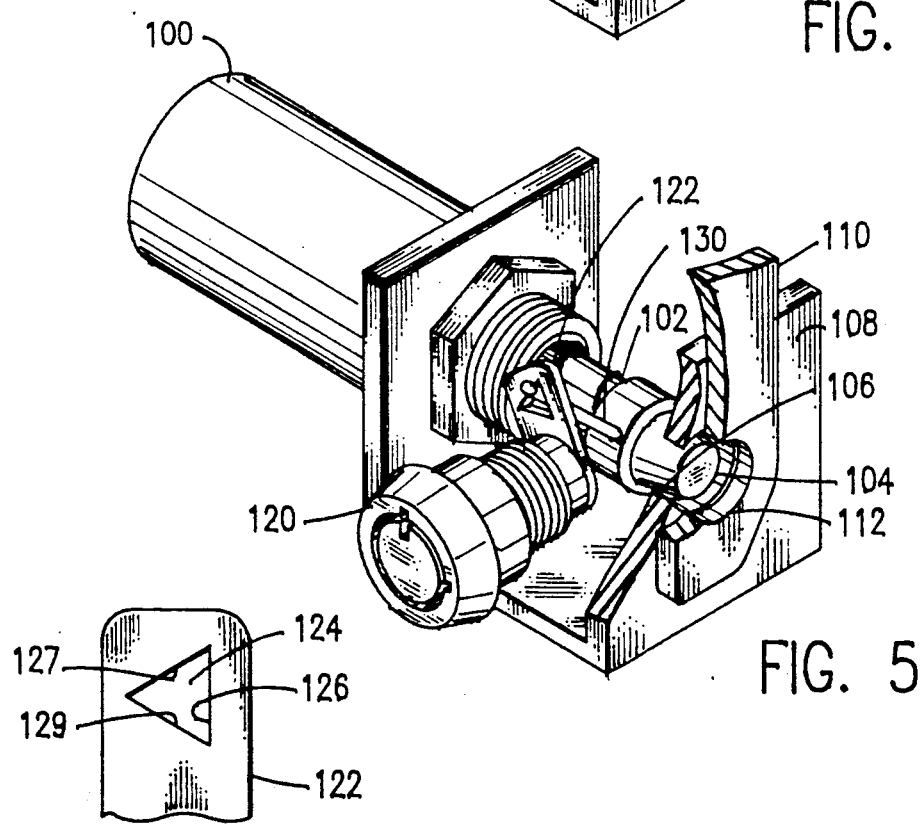
FIG. 5
FIG. 6

ASSEMBLY FOR MOUNTING A SHOTGUN TO A CAR SEAT

TECHNICAL FIELD

This invention relates, generally, to brackets for safely mounting shotguns within the forward passenger compartment of a police car.

BACKGROUND ART

Shotguns do not require careful aim, and are thus the weapon of choice of most police officers when confronted with a life-threatening situation. The weapon is extremely dangerous, however, and cannot be safely stored under a seat or anywhere else in a vehicle in the absence of a mounting means.

Accordingly, inventors have developed various mounting brackets that hold the weapon in a secure position until it is needed. Some of these brackets grip the weapon forwardly of the trigger group, thereby exposing the trigger. An example of such a bracket is shown in U.S. Pat. No. 4,364,499 to McCue.

Some brackets also permit movement of the action slide pump release mechanism by which a shell can be chambered and the gun cocked while still in the lock. A bracket that exposes both the trigger group and the release mechanism is a part of the prior art known to the present inventor. See U.S. Pat. No. 3,857,491 to Townsend et. al. for a gun rack having those features.

Many of these mounting systems include a switch or switches mounted on the dashboard of the vehicle that controls the locking and unlocking of the mounting apparatus. Typically, the officer depresses a button or buttons to unlock the mounting bracket so that the weapon can be quickly retrieved therefrom.

More particularly, the switch or button closes a circuit that includes the coil of a solenoid so that when the switch is thrown, the plunger of the solenoid is retracted into the area surrounded by the coils in the well known manner. The plunger, when extended, extends through a latch opening that prevents opening of the mounting bracket; thus, retraction of the plunger frees the locking mechanism and allows the officer to remove the weapon.

A major problem with the known systems relates to the dashboard-mounted switches. Those switches are normally depressed when the officer is in a very agitated state of mind. As a result, the buttons are often held down too long or pressed repeatedly in a rapid fashion, and such treatment of the switches causes solenoid failure. If the solenoid fails, the officer cannot gain access to the weapon.

Accordingly, there is a need for a shotgun mounting bracket that can be quickly opened by an officer even if the bracket-opening solenoid has failed, i.e., there is a need for a solenoid-overriding means.

Moreover, there is a need for a mounting bracket that can adjust itself as required when the driver's seat of the squad car is adjusted forwardly or rearwardly.

Another need exists for a mounting bracket that engages the weapon at the trigger group so that the trigger cannot be pulled while the weapon is in its mount.

The prior art, taken as a whole, neither teaches or suggests how these and other longstanding needs could be fulfilled.

BRIEF DESCRIPTION OF INVENTION

The longstanding but heretofore unfulfilled need for an improved shotgun mounting system is now provided in the form of an apparatus having a base secured to a passenger's seat, an elongate pivot arm that is hingedly mounted to that base, and a unique gun carrier means mounted to the distal free end of the pivot arm. The gun carrier means is therefore positioned on the driver's side of the vehicle, where it is readily accessible.

The gun carrier has two primary positions. In its first, closed position, the weapon cannot be lifted therefrom because a stop plate overhangs the open top of the carrier. In a second, rotated position, the carrier is angled away from the stop plate and the weapon may be lifted therefrom. An optional bias means urges the carrier to rotate from said first, closed position toward said second, open position, but the plunger of a solenoid in repose prevents such rotation. Thus, upon activation of the solenoid, the plunger retreats and the bias means rotates the carrier about a hinge and said carrier assumes its second, open position. In a preferred embodiment, the bias means is not used and the officer rotates the carrier into its open position by lifting the weapon and simultaneously rotating it.

A chain has a first end secured to the back of the gun carrier assembly and its second or trailing end is secured to an underframe of the driver's seat. The underframe slides rearwardly and forwardly as the driver adjusts his or her seat to his or her height; the chain is attached tautly so that it retains the gun carrier against the forward wall of the seat, below the driver's knees, in all positions of the seat.

The hinged mounting of the pivot arm allows the gun carrier at the free end of the arm to move forwardly and rearwardly relative to the fixed base of the mounting apparatus as the position of the driver's seat is adjusted.

The gun carrier is in the form of an open-topped channel member. It has a bottom wall with an opening formed therein so that the trigger group of the weapon is received therewithin when the weapon is properly stored.

A set screw is selectively adjusted to control the amount of swing of the gun carrier about its hinge, depending upon where the gun carrier is mounted inside the forward passenger compartment. For example, a forty five degree swing is optimal when the carrier is positioned below the officer's knees, where as a greater degree of swing is desirable if the weapon is mounted above the officer's head on the partition wall that separates the forward passenger compartment from the rearward passenger compartment.

Still another unique feature of the present invention is provided in the form of a key-activated means that enables the officer to unlock the gun carrier even when the solenoid has failed. The free end of the solenoid's plunger is provided with a tapered cap and a locking pin extends radially from the cap. The pin is received within a delta-shaped opening that is formed in a plate that rotates conjointly with a lock cylinder when said cylinder is rotated by the officer's key. The opening captures the locking pin so that when the key is turned, the locking pin drives the plunger into its retracted or energized position to thereby free the gun carrier.

It is therefore understood that a primary object of this invention is to provide an improved shotgun mount that does not restrict movement of the driver's seat.

Another very important object is to provide a gun mount that can be opened even if the conventional means for opening it fails for any reason.

Still another major object is to provide a shotgun mounting bracket that guards the trigger group of the weapon and the action slide pump mechanism release button that enables positioning of a shell into the shotgun chamber.

Still another object is to provide such a bracket that enables mounting of the shotgun below the officer's knees or above the officer's head on a partition wall that divides the forward passenger compartment from the rearward passenger compartment.

These and other important objects, advantages and features of the invention will become apparent as this description proceeds.

The invention accordingly comprises the features of constructions, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 2 is a perspective view of the gun carrier assembly that receives the receiver part of the shotgun;

FIG. 3 is a transverse sectional view of the gun carrier assembly shown in FIG. 2, including a deployed position of the gun carrier;

FIG. 4 is a perspective, partially broken away view of the novel locking assembly showing the solenoid plunger in its extended, locking configuration;

FIG. 5 is a perspective view similar to FIG. 4, but showing the solenoid in its retracted, unlocked configuration; and FIG. 6 is a side elevational view of the novel locking plate.

BEST MODES FOR CARRYING OUT THE INVENTION

Figure 1:
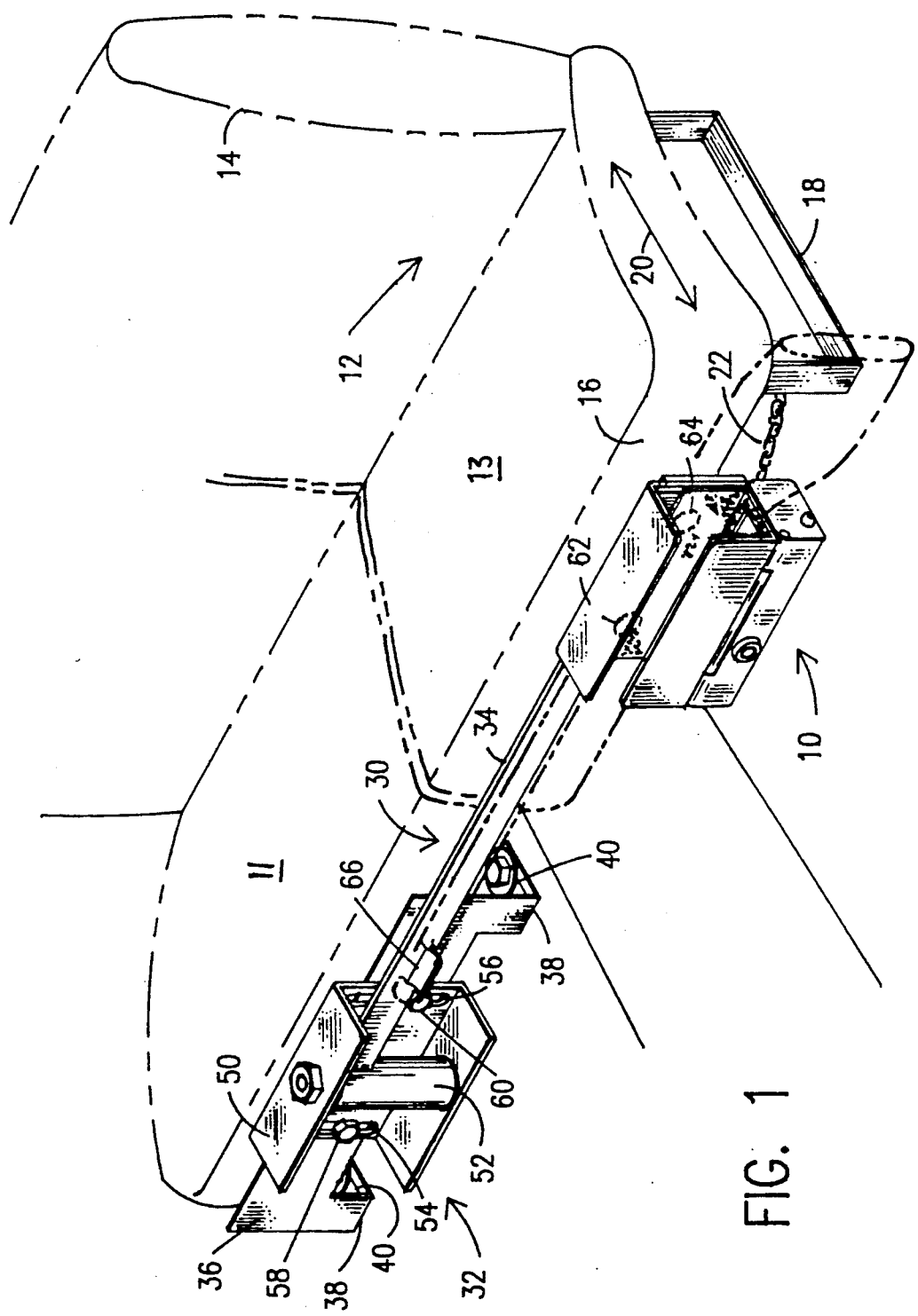
FIG. 1 is a perspective view of the novel shotgun rack, showing a shotgun and a car seat in phantom lines.

The surrounding environment of the novel apparatus is best understood in connection with FIG. 1. Seat 12 has back 14 and a front wall 16 and individual seats 11 and 13. The majority of police vehicle seats are either split bench 50/50, 60/40, or bucket seats, thereby facilitating the use of the novel pivotal mount described in detail hereinafter. An underframe 18 is moveably mounted as indicated by directional arrow 20 so that both short and tall officers can align seat 12 to their liking.

Chain 22 extends tautly between said underframe 18 and a rear wall of the gun carrier assembly, denoted 10 as a whole, so that said gun carrier assembly is maintained in abutting relation to front wall 16 as the seat is adjusted.

The novel mounting bracket is denoted 30 as a whole. It includes base 32, elongate pivot arm 34, and gun carrier assembly 10 which is fixedly secured to the distal free end of arm 34.

More particularly, base 32 includes an upstanding flat plate 36 and a pair of laterally spaced feet 38 that are integrally formed therewith and which have an orthogonal bend formed therein as shown. Longitudinally extending slots 40 are formed in each foot 38; they slidingly receive an immobile part of the seat mount, not shown, of the passenger's seat. Fastening means, as shown, extend through their associated slots 40 and affix said feet to said immobile seat mount.

A channel-shaped member 50 carries hinge 52, has a pair of parallel slots 54, 56 formed therein and is adjustable secured to flat plate 36 by bolts 58, 60. Thus, hinge 52 and pivot arm 34 integral therewith are vertically adjustable to suit the preferences of the officer.

A pair of bores 62, 64 are formed in pivot arm 34 near its free end; these bores enable mounting of gun carrier assembly 10 to arm 34.

A muzzle cradle 66 that supports the barrel of the shotgun is positioned near the proximal end of pivot 34 arm as shown.

As best shown in FIGS. 2 and 3, gun carrier assembly 10 has a stop plate 70, a back wall 72, a bottom wall 74, and a front wall 76. A pair of bolts 80, 80, only one of which is visible in FIG. 3, extend through apertures formed in back wall 72 and engage bores 62, 64 formed in the distal end of pivot arm 34 to secure the gun carrier assembly to said pivot arm.

A square channel-shaped gun carrier 84 is hingedly mounted by concealed hinge 86 to front wall 76 at the top edge of said front wall 76. Carrier 84 is lined with a felt or carpet-like lining 85 so as not to mar the surface of the metallic receiver part of the shotgun which is received with said carrier 84. The width and length of gun carrier 84 corresponds to the dimensions of the receiver part of the weapon.

A rectangular opening 88 (FIG. 2 )is formed in bottom wall 90 of gun carrier 84 to receive the trigger group of the weapon. Opening 88 therefore also serves as a guide means that facilitates proper positioning of the shotgun in its carrier 10. It should be clear, therefore, that the cavity 91 (FIG. 3) bounded by walls 72, 74, and 76 is substantially unoccupied immediately beneath opening 88.

Solenoid 100 having an outwardly biased plunger 102 is positioned in the opposite end of cavity 91, and is best shown in FIGS. 4 and 5. Tapered cap 104 is fixedly secured to the distal free end of plunger 102 and is axially received within opening 106 formed in square "U" shaped bracket 108 when the plunger is extended, i.e., when no current is flowing through the coils of the solenoid.

Locking tab 110 depends from bottom wall 90 of gun carrier 84 and is also centrally apertured as at 112; this aperture 112 is in registration with aperture 106 and tapered cap 104 extends through both of said apertures when the solenoid coil is not energized as shown in FIG. 4, thereby locking gun carrier assembly 10 in its FIG. 2 position.

When the coil is energized and plunger 102 is retracted, torsion spring in hinge 86 rotates gun carrier 84 about hinge 86 to the position shown in phantom lines in FIG. 3. However, such spring is not needed and is not depicted; the officer can easily manually rotate carrier 84 about hinge 86 when plunger 102 is retracted. Set screw 116 limits the angular sweep of gun carrier 84. If the shotgun is mounted above seat back 14, i.e., on the imperforate partition wall that separates the forward passenger compartment from the rear passenger compartment, the set screw 116 is backed off and a greater amount of rotation can occur to facilitate removal of the weapon from channel 84.

If activation of the dashboard buttons fails to actuate the solenoid, the officer may rotate lock cylinder 120 with a key. Locking plate 122, having delta-shaped opening 124 formed therein, is conjointly rotatable with lock cylinder 120. Opening 124 receives and captures locking pin 130 that extends radially from annular band that encircles plunger 102 and which is secured thereto and carried thereby. Thus, counter-clockwise rotation of lock cylinder 120 forces the locking pin 130 and hence plunger 102 to retract, as shown in FIG. 5, thereby freeing locking tab 110 from cap 104 and enabling rotation of gun carrier 84 about hinge 86.

More particularly, the vertical part 126 (see FIG. 6) of opening 124 bears against locking pin 130 and drives it and cap 104 inwardly as perhaps best understood by comparing FIGS. 4 and 5. The angled parts 127, 129 of opening 124 serve to center locking pin 130 and hence plunger 102 when the plunger is extended, i.e., when the solenoid 100 is in repose. The specific orientation of triangular opening 124 is such that a line drawn from the apex thereof that bisects part 126 is parallel to the longitudinal axis of symmetry of solenoid 100 when said solenoid is in repose as depicted in FIG. 4.

This invention is clearly new and useful. Moreover, it would not have been obvious to one of ordinary skill in this art at the time it was made, in view of the prior art, considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. An apparatus for safely mounting a shotgun within the passenger compartment of a vehicle, comprising:
    a gun carrier assembly;
    said gun carrier assembly including a channel shaped gun carrier having an open top and a predetermined length and width;
    said gun carrier having a pair of substantially parallel side walls and a bottom wall;
    said gun carrier having a first, locked position and a second, unlocked position;
    a hinge member that facilitates movement of said gun carrier between said first and second positions;
    a locking means for unlocking said gun carrier when it is in its first position;
    an opening of predetermined configuration formed in said bottom wall; and
    said opening specifically configured and dimensioned to receive a trigger group of a shotgun;
    whereby positioning said trigger group into registration with said opening properly positions the shotgun with respect to said gun carrier.

2. The apparatus of claim 1, further comprising a stop member positioned in closely spaced relation to said open top of said gun carrier when said gun carrier is in its first position, said stop member barring removal of said shot gun from said gun carrier only when said gun carrier is in its first position.

3. The apparatus of claim 2, further comprising a hollow housing means positioned in contiguous relation to said gun carrier bottom wall, said trigger group extending into a substantially unoccupied part of said housing means when said shotgun is held by said gun carrier.

4. The apparatus of claim 3, further comprising a locking tab member, fixedly secured to and depending from said gun carrier bottom wall, said tab member extending into said hollow housing means and there being an aperture formed in a distal free end of said tab member.

5. The apparatus of claim 4, further comprising engaging means for selectively engaging said aperture formed in said locking tab member when said gun carrier is in said first position, said engaging means positioned in said hollow housing means in non-interfering relation to said trigger group extending thereinto when a shotgun is carried by said gun carrier.

6. The apparatus of claim 5, wherein said engaging means includes a tapered cap member, said cap member being moveably mounted between an extended position where it extends through said locking tab member aperture and a retracted position where it does not, said gun carrier being locked when said cap member is extended and being unlocked when said cap member is retracted.

7. The apparatus of claim 6, wherein said cap member is fixedly secured to the distal free end of an outwardly biased plunger that forms part of a solenoid, said cap member extending through said tab member aperture when said solenoid is in repose and said cap member being retracted and out of engagement with said tab member aperture when current is supplied to said solenoid, and, alternatively, when a key-rotatable lock cylinder is rotated by a key.

8. The apparatus of claim 7, further comprising an annular band that encircles said plunger and which is carried thereby, a locking pin that extends radially from said annular band, said locking means including said key-rotatable lock cylinder and a pin-capturing member that drives said locking pin and hence said cap member into said retracted position to enable opening of said gun carrier when said lock cylinder is rotated by a key.

9. The apparatus of claim 8, wherein said pin-capturing member is a flat locking plate member that is fixedly secured to and conjointly rotatable with said lock cylinder and wherein a triangular-shaped opening is formed in said pin-capturing member.

10. The apparatus of claim 9, wherein said triangular-shaped opening is oriented relative to said locking plate member such that an apex thereof is coincident with an axis of symmetry of said solenoid and a base thereof is bisected by said axis of symmetry when said solenoid is in repose.

11. An apparatus for safely mounting a shotgun within the passenger compartment of a vehicle, comprising:
    a gun carrier assembly;
    said gun carrier assembly including a channel-shaped gun carrier having an open top and a predetermined length and width;
    said gun carrier having a pair of substantially parallel side walls and a bottom wall;
    said gun carrier having a first, locked position and a second, unlocked position;

a hinge member that facilitates movement of said gun carrier between said first and second positions;

a locking means for unlocking said gun carrier when it is in its first position;

an immovably mounted base member;

an elongate pivot arm hingedly mounted to said base member;

said gun carrier being fixedly secured to a distal free end of said pivot arm;

a chain interconnecting said gun carrier and a movably mounted underframe of a driver's seat of said vehicle, said chain being taut and holding said gun carrier in abutting relation to a forward surface of said driver's seat.

12. The apparatus of claim 11, wherein said base member is fixedly secured to a seat mount of a passenger's seat of said vehicle.

13. The apparatus of claim 11, wherein said pivot arm is vertically adjustable relative to said immovably mounted base member.

14. The apparatus of claim 11, further comprising a muzzle cradle member mounted on said pivot arm near a proximal end thereof.

15. The apparatus of claim 11, wherein the predetermined length of said gun carrier is substantially equal to the extent of a receiver part of a shotgun.

16. The apparatus of claim 15, wherein said gun carrier is lined with a pad means so that said receiver part is not marred by said gun carrier.

* * * * *